US006396510B1

United States Patent
Pendse et al.

(10) Patent No.: US 6,396,510 B1
(45) Date of Patent: May 28, 2002

(54) METHOD AND APPARATUS FOR SCHEDULING A MULTI-POINT ELECTRONIC CONFERENCE

(75) Inventors: Ajit Pendse, Portland; Gregory H. Kisor, Beaverton, both of OR (US)

(73) Assignee: Intel Corporation, Santa Clara, CA (US)

(*) Notice: Subject to any disclaimer, the term of this patent is extended or adjusted under 35 U.S.C. 154(b) by 912 days.

(21) Appl. No.: 08/667,242

(22) Filed: Jun. 21, 1996

(51) Int. Cl.$^7$ ................................. G09G 5/00
(52) U.S. Cl. .................. 345/739; 345/753; 345/816
(58) Field of Search ................. 345/326–358; 379/202–205, 158; 348/15

(56) References Cited

U.S. PATENT DOCUMENTS

| | | | | |
|---|---|---|---|---|
| 4,862,390 A | * | 8/1989 | Weiner | 345/352 |
| 5,195,086 A | * | 3/1993 | Baumgartner et al. | 379/202 X |
| 5,323,445 A | * | 6/1994 | Nakatsuka | 348/15 |
| 5,347,306 A | * | 9/1994 | Nitta | 348/15 |
| 5,491,743 A | * | 2/1996 | Shiio et al. | 379/202 |
| 5,530,472 A | * | 6/1996 | Bregman et al. | 348/15 |
| 5,541,639 A | * | 7/1996 | Takatsuki et al. | 348/15 |
| 5,619,555 A | * | 4/1997 | Fenton et al. | 379/202 X |
| 5,627,978 A | * | 5/1997 | Altom et al. | 345/330 |
| 5,631,904 A | * | 5/1997 | Fitser et al. | 379/205 X |
| 5,642,156 A | * | 6/1997 | Saiki | 348/15 |
| 5,689,641 A | * | 11/1997 | Ludwig et al. | 345/331 X |
| 5,717,863 A | * | 2/1998 | Adamson et al. | 395/200.34 |
| 5,745,711 A | * | 4/1998 | Kitahara et al. | 345/330 |

OTHER PUBLICATIONS

International Telecommunication Union, ITU–T Recommendation H.320 (03/93), Narrow–Band Visual Telephone Systems and Terminal Equipment, pp. 1–12.
International Telecommunication Union, ITU–T Recommendation X.500 (11/93), Information Technology—Open Systems Interconnection—The Directory: Overview of Concepts, and Services.

* cited by examiner

Primary Examiner—John Breene
(74) Attorney, Agent, or Firm—Blakely, Sokoloff, Taylor & Zafman LLP

(57) ABSTRACT

A computer system is programmed with a scheduler for scheduling multi-point electronic conferences with a multi-point conferencing control service. The scheduler is equipped to automatically connect a user to a remote directory service for selection of some or all of the participants the user wants to be included in the multi-point electronic conference being scheduled. In the presently preferred embodiments, the user is connected to an independent directory service of the user's choice, and the independent directory services available for selection are public directory services having names and connection addresses for a large number of persons.

26 Claims, 10 Drawing Sheets

METHOD AND APPARATUS FOR SCHEDULING A MULTI-POINT ELECTRONIC CONFERENCE

BACKGROUND OF THE INVENTION

1. Field of the Invention

The present invention relates to the field of electronic conferencing. More specifically, the present invention relates to the scheduling of a multi-point electronic conference.

2. Background Information

Electronic conferencing systems and conferencing control services capable of supporting multi-point electronic conferences are known in the art. An example of such a personal video/data conferencing system is the ProShare™ Video/Data Conferencing System developed and manufactured by Intel Corp. of Santa Clara, Calif., assignee of the present invention. An example of such conferencing control services is World Worx Service[SM] provided by AT&T of New Jersey.

However, most of today's multi-point electronic conferencing systems/services have at least one disadvantage, in that in scheduling a multi-point electronic conference, a user has to typically schedule the conference manually, i.e. by calling the multi-point conferencing control service. While Intel's Proshare™ Video/data Conferencing System and AT&T's World Worx Service[SM] provide computer aided scheduling, and allow a user to submit conference schedules electronically, the combination still has the disadvantage of allowing only the user to specify the scheduled participants by either entering their names and connection addresses or selecting them from address books accessible to the user. Since address books accessible to a user are typically limited to the user's own private address books or address books available on a networked server, such as a corporate address book, thus effectively, the domain from which the user can select the scheduled participants is limited to those having had prior contacts with the user (and the user have taken the effort to record their names and connection addresses) or those having certain affinities, such as organizational, with the user.

Since it is often necessary and desirable to be able to schedule a multi-point electronic conference with participants that do not have prior recorded contacts or affinities with a user, it is desirable to be able to have an approach to schedule multi-point electronic conferences that offer a larger domain from which the user can select the scheduled participants. As will be disclosed in more detail below, the method and apparatus of the present invention achieves these and other desirable results.

SUMMARY OF THE INVENTION

A computer system is programmed with a scheduler for scheduling multi-point electronic conferences with a multi-point conferencing control service. The scheduler is equipped to automatically connect a user to an independent directory service for selection of some or all of the participants the user wants to be included in the multi-point electronic conference being scheduled. In the presently one embodiments, the user is connected to an independent directory service of the user's choice, and the independent directory services available for selection are public directory services having names and connection addresses for a large number of persons.

In one embodiment, the scheduler is a component of a general purpose electronic conference (GPEC) system being programmed onto the computer system. In an alternate embodiment, the scheduler is a component of a multi-point conferencing control service being programmed onto the computer system.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
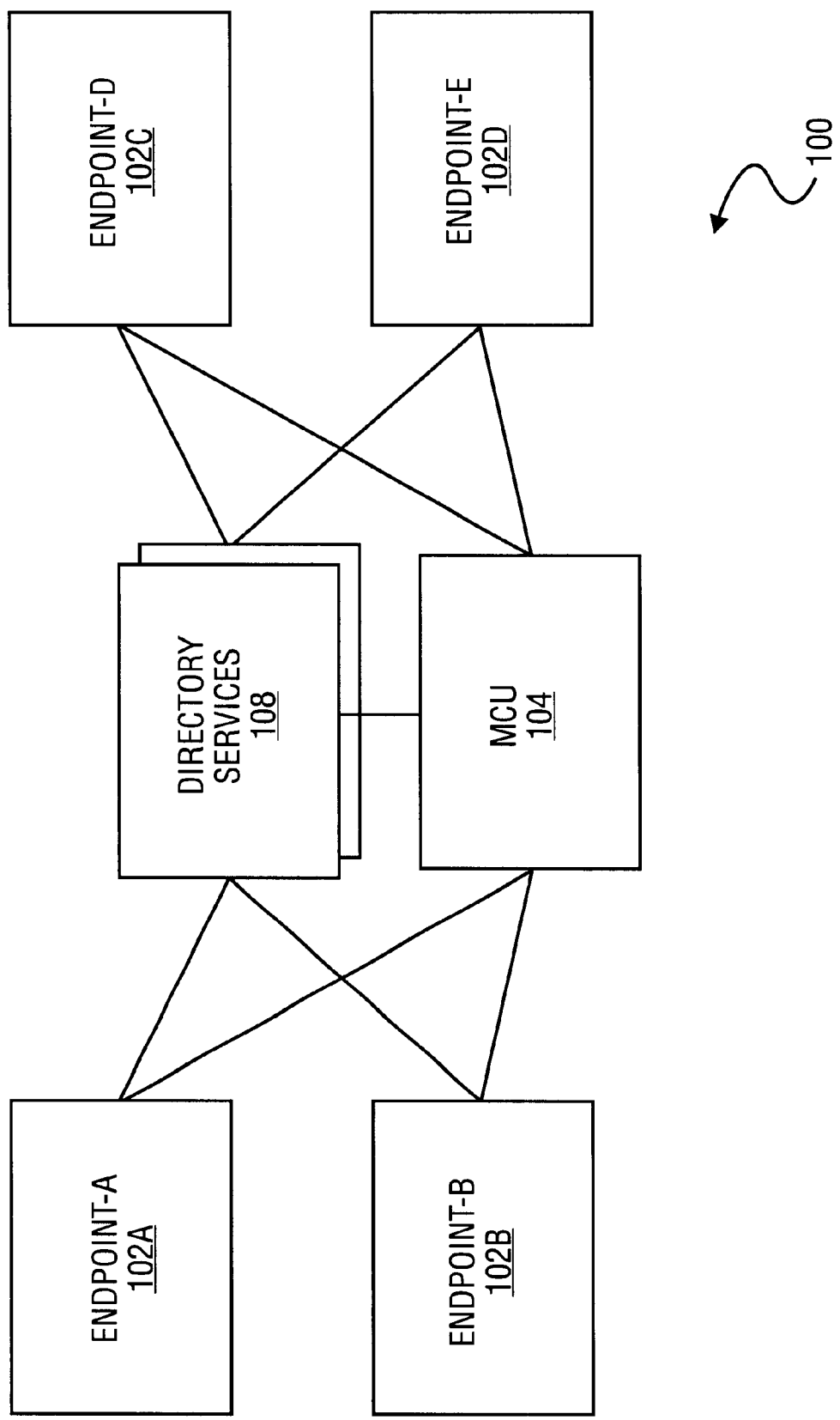
FIG. 1 is a block diagram illustrating one embodiment of a typical multi-point electronic conference with at least one of the endpoint and/or the multi-point control unit incorporating the teachings of the present invention.

Referring now to FIG. 1, a block diagram illustrating one embodiment of a multi-point electronic conference with at least one endpoint and/or a multi-point control unit incorporating the teachings of the present invention is shown. For the illustrated embodiment, multi-point electronic conference 100 includes a number of endpoints 102a–102d, and multi-point control unit (MCU) 104. More importantly, in accordance with the present invention, either MCU 104 or each of the endpoints 102a–102d is incorporated with a scheduler for facilitating scheduling of multi-point electronic conferences with MCU 104. The facilitation includes automatic connection of an endpoint 102a, 102b, 102c and 102d (hereinafter 102*), to one of a plurality of independent directory services 108, to facilitate selection by a user at one of the endpoints 102* of one or more members of the connected independent directory service 108 as scheduled participants of a multi-point electronic conference being scheduled. In one embodiment, independent directory services 108 are public directory services having names and connection addresses of a large number of persons.

Endpoints 102a–102d, MCU 104, and directory services 108 are coupled to each other through a public switching telephone network via e.g. POTS or ISDN. At scheduling timing, an endpoint 102a, 102b, 102c, or 102d is connected to one of the directory services 108 by calling the particular directory service 108 directly or by MCU 104 making the call on the endpoint's behalf, to be more fully described below also.

While for ease of explanation, multi-point electronic conference 100 is illustrated with only four endpoints 102a–102d, and all endpoints 102a–102d are joined in conference via one MCU 104, based on the description to follow, it will be appreciated that the present invention may be practiced with more or less endpoints 102a–102b, and/or MCUs 104. Furthermore, MCU 104 may be managing multiple multi-point electronic conferences.

For the illustrated embodiment, endpoints 102a–102d, MCU 106 and directory services 108 are all equipped with one or more Pentium™ or PentiumPro™ class processors manufactured by Intel Corporation of Santa Clara, Calif., assignee of the present invention. Of course, processors manufactured by other vendors may be employed. Each of endpoints 102a–102d, MCU 106 and directory services 108 is also equipped with communication interface(s) and storage media. Endpoints 102a–102d are further equipped with audio/video subsystems. Communication interfaces, storage media, and audio/video subsystems may be implemented with any number of such elements well known in the art.

For the illustrated embodiment, endpoints 102a–102d are all programmed with compatible general purpose electronic conferencing (GPEC) systems, e.g. GPEC systems that support International Telecommunication Union—Telecommunication Standardization Sector (ITU-T) H.320, Narrow Band Visual Telephone System and Terminal Equipment, March 1993, such as ProShare™ V2.0 manufactured by Intel Corp. However, in one adaptation, in addition to the conventional conferencing functions, each GPEC system further includes the multi-point electronic conference scheduler of the present invention. Based on the description to follow, it will be apparent to those skilled in the art that the scheduler of the present invention may be implemented as a standalone component or integrated with any one of a number of GPEC's components. MCU 104 is programmed with conventional multi-point conferencing control service known in the art, similar to those offered by AT&T's WorldWorx℠ Service. However, in one adaptation, in addition to the conventional multi-point conferencing control functions, the control service further includes the multi-point electronic conference scheduler of the present invention. In one adaptation, the control service further includes the capability of sharing applications executing on MCU 104 with endpoints 102a–102d, without having to replicate and execute the applications on endpoints 102a–102d, and the scheduler of the present invention is application shared with endpoints 102a–102d. Similarly, based on the description to follow, it will be apparent to those skilled in the art that the scheduler of the present invention may be implemented as a standalone component or integrated with any one of a number of multi-point control service components.

Directory service 108 is programmed with conventional directory services, e.g directory services that support ITU's X.500, Information Technology—Open System Interconnection—The Directory Overview of Concepts, Models and Services, November 1993, such as Deutches Telecom's T-Online directory service.

For a more detailed description of ProShare™, WorldWorx℠ and T-Online directory services, refer to their respective product literature. For a more detailed description of application sharing, see co-pending U.S. patent application, Ser. No. 261,740, entitled Apparatus and Method For Application Sharing in a Graphical User Interface, filed on Jun. 17, 1994, assigned to the assignee of the present invention.

Figure 2:
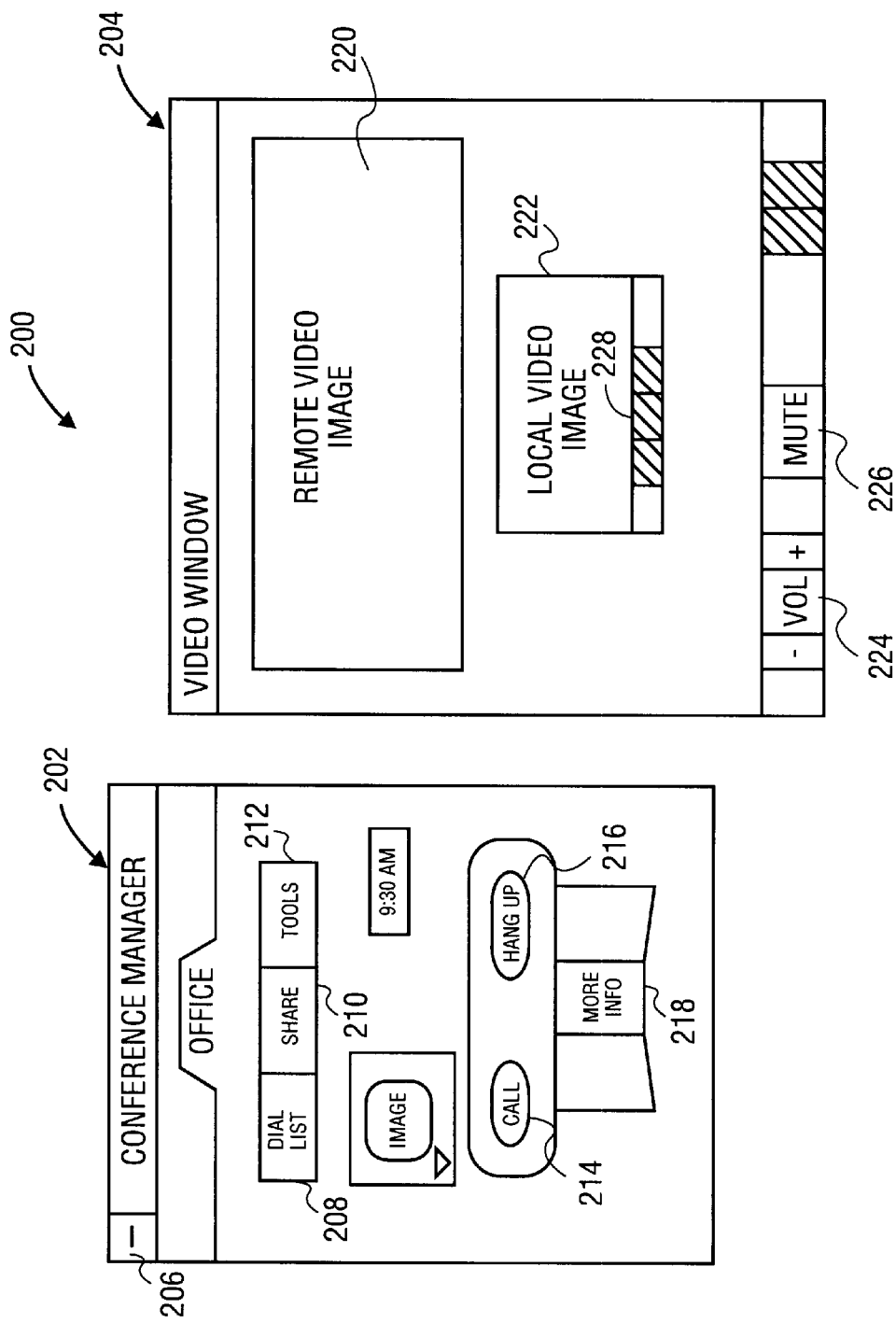
FIG. 2 is a pictorial diagram illustrating one embodiment of one screen of an end user interface suitable for employment by a GPEC system.

FIG. 2 is a pictorial diagram illustrating one embodiment of one screen of an end user interface suitable for employment by a GPEC system. As shown, screen 200 includes windows 202 and 204. Window 202 presents a number of end user interface elements 206–218 through which a user may interact with a conference manager component of the GPEC system, whereas window 204 presents remote and local video images 220–222 and a number of end user interface elements 224–228 through which the user may interact with a video and an audio subsystem of the GPEC system. The conference manager component provides conventional conference management services such as connect and disconnect, whereas the video and audio subsystems perform the conventional video and audio services, such as compression and decompression of video and audio data, and color conversion.

End user interface elements 220–222 and 224–228 are intended to represent a broad category of iconic elements found in graphical end user interfaces. For the illustrated embodiment, icon 206 is employed to facilitate invocation of the scheduler of the present invention. Based on the description to follow, those skilled in the art will readily appreciate that the scheduler may be invoked in a number of other ways known in the art. The scheduler may be invoked with or without an electronic conference in session.

Figure 3:
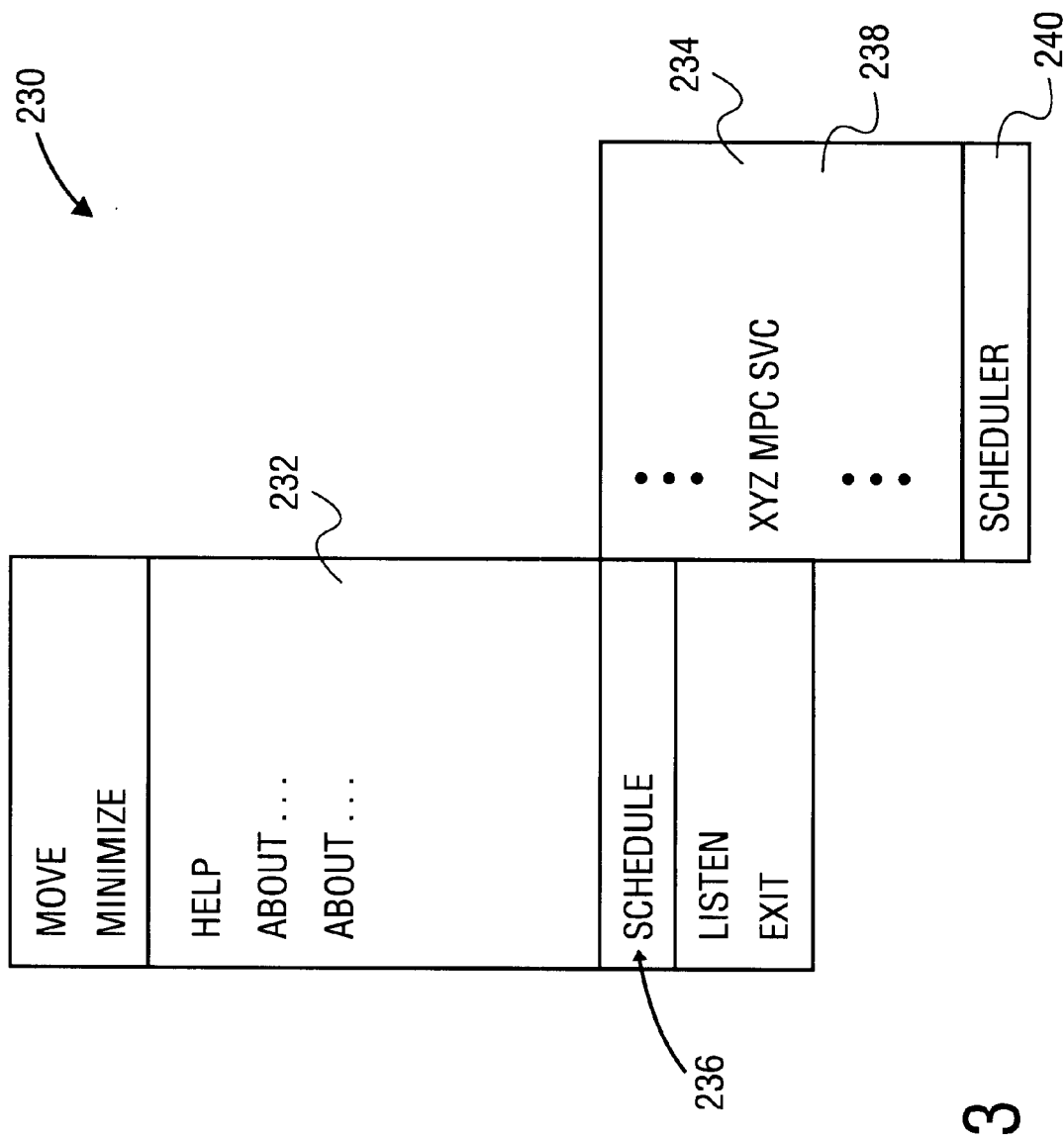
FIG. 3 is a pictorial diagram illustrating one embodiment of a pop-up dialog suitable for use in conjunction with the screen of FIG. 2 for facilitating invocation of the scheduler of the present invention by a user.

FIG. 3 illustrates one embodiment of a pop-up dialog suitable for use in conjunction with the above described screen for facilitating invocation of the scheduler of the present invention by a user. As shown, pop-up dialog 230 is a multi-level dialog, including first level dialog 232 and second level dialog 234. First level dialog 232 displays a number of tasks the user may select, including in particular, a "schedule" task. First level dialog 232 is displayed when the user selects icon 206 in window 202. Second level dialog 234 displays a number of multi-point conferencing control services 238 with whom a multi-point electronic conference may be scheduled, e.g. XYZ Multi-Point Conferencing Service. In one embodiment, second level dialog 234 also provides a selection 240 for the user to simply invoke the scheduler to "re-open" a previously saved conference schedule for modifications, e.g. date, time, participants etc. Second level 234 is displayed when the user selects the "schedule" task 236 from the task list of first level dialog 232.

Figure 4:
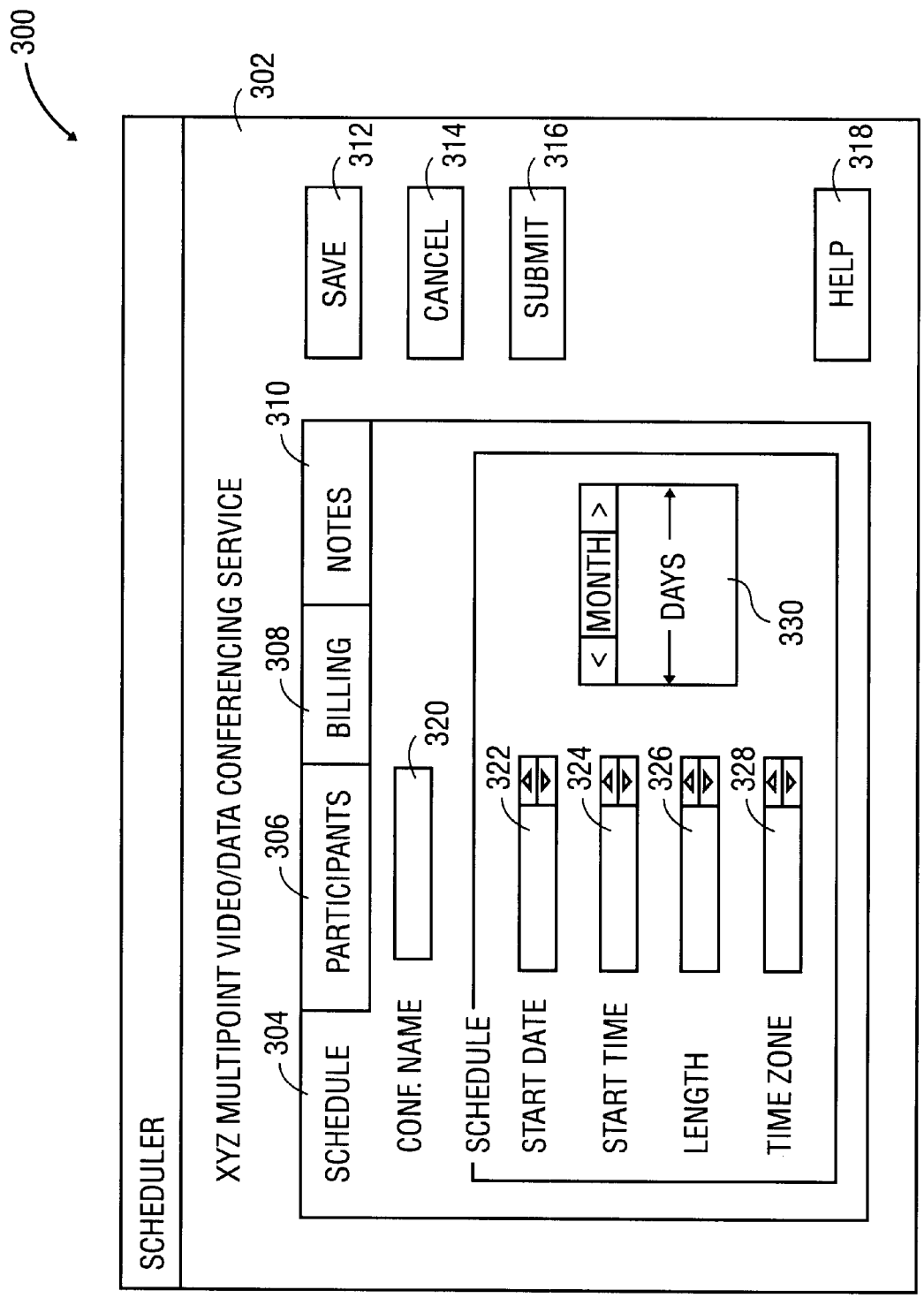
FIGS. 4–8 are pictorial diagrams illustrating one embodiment of a number of screens employed by the scheduler for facilitating multi-point electronic conference scheduling by the user.
Figure 5:
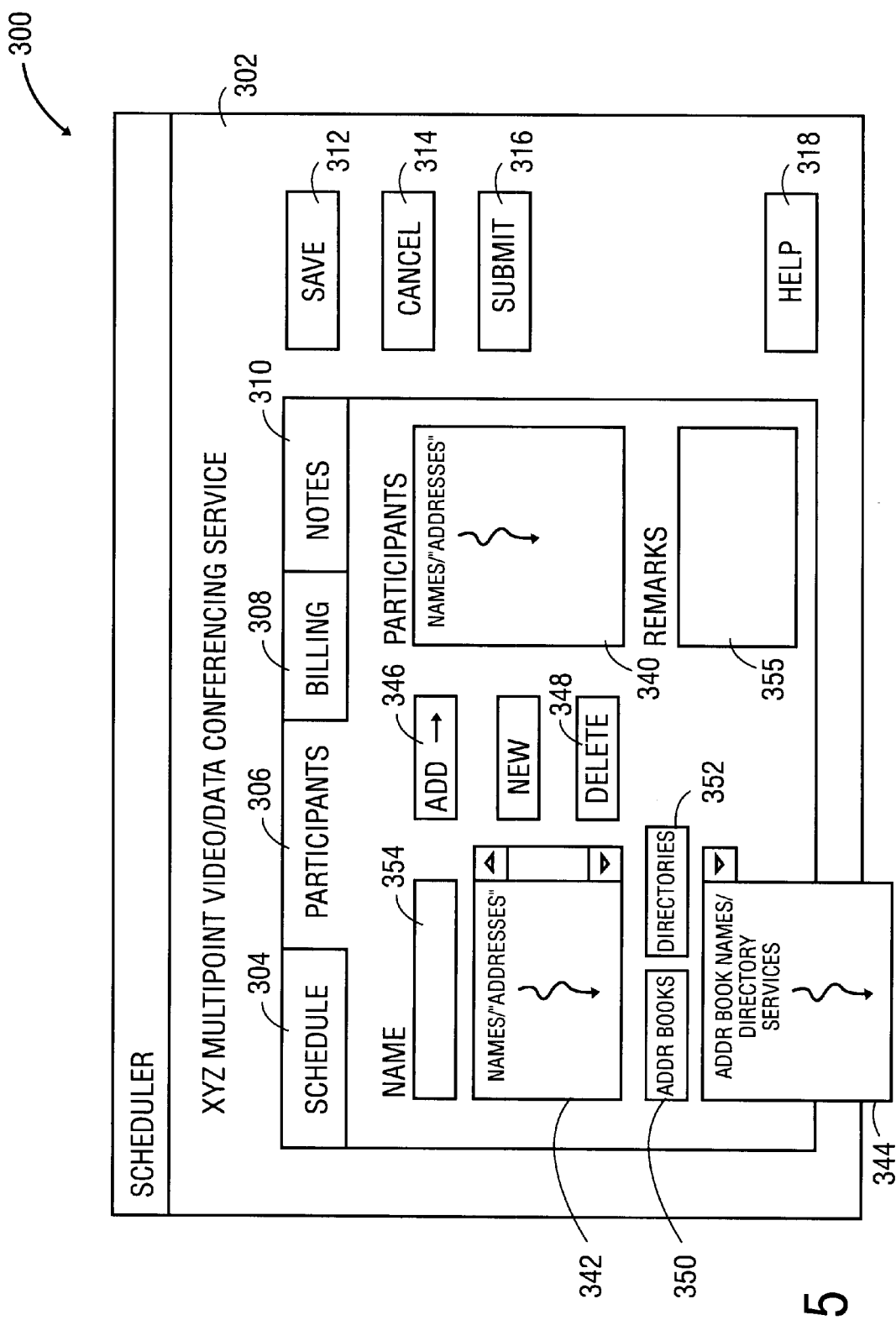
Figure 6:
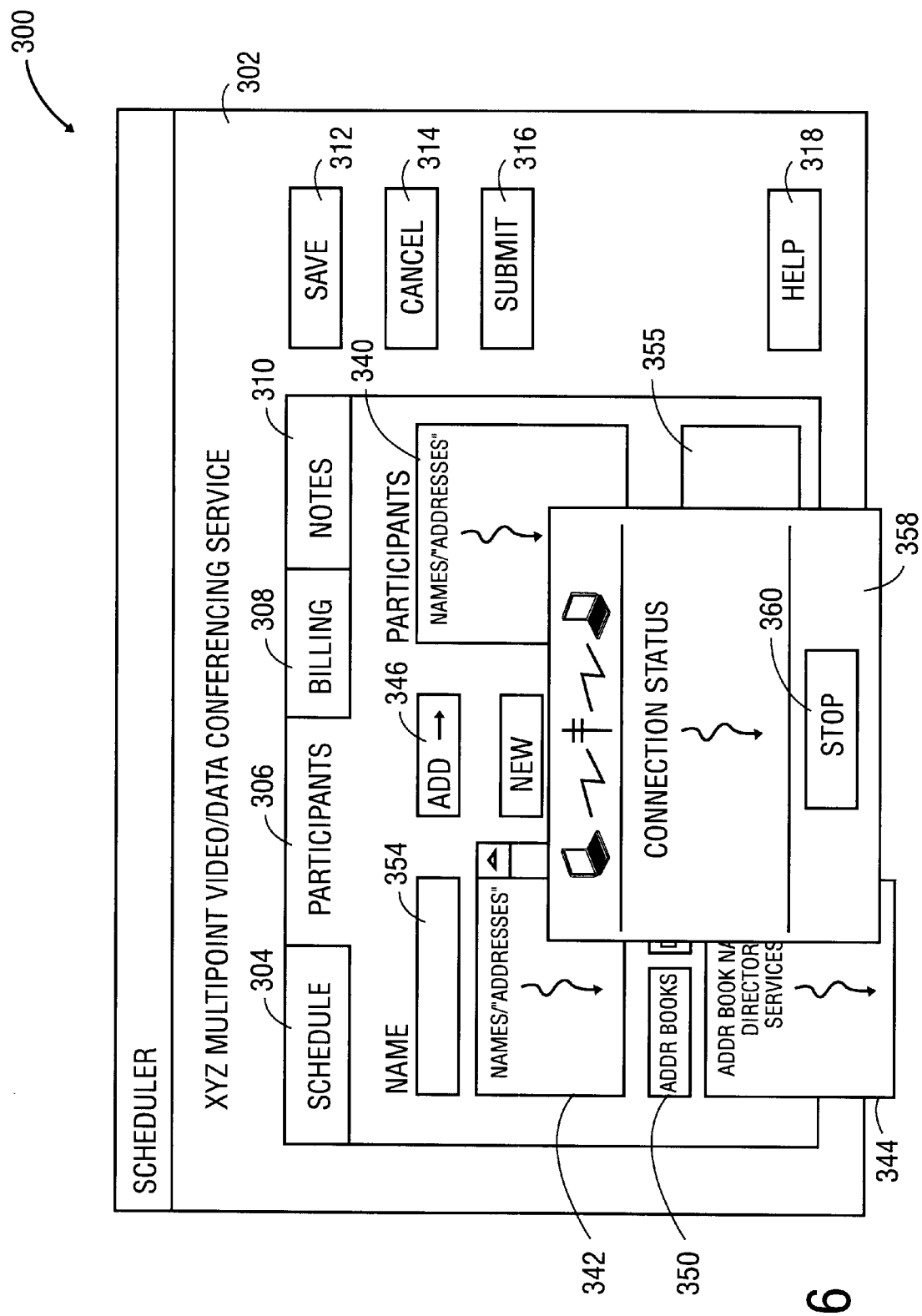

FIGS. 4–6 illustrate one embodiment of a number of screens employed by the scheduler for facilitating multi-point conference scheduling by a user. As shown, screens 300 include window 302 having a number of related attribute panes 304–310 and a number of global control buttons 312–318. In particular, related attribute panes 304–310 include schedule pane 304 for specifying dates and times of a multi-point electronic conference to be scheduled, and participants pane 306 for specifying scheduled participants of the multi-point electronic conference being scheduled. Global control buttons 312–318 include in particular, save button 312 for saving a conference schedule, thereby allowing the conference schedule to be subsequently retrieved for modification, e.g. rescheduling the conference to a different day and/or time, adding/deleting scheduled participants etc. Global control buttons 312–318 also include a submit button 316 for submitting (and resubmitting) a multi-point electronic conference schedule to the selected multi-point conferencing control services.

As shown in FIG. 4, schedule pane 304 includes field 320 for naming the conference being scheduled. Additionally, schedule pane 304 includes field 322–328 for entering the start date, start time, length and time zone of the conference to be scheduled. In one embodiment, field 322 supports a short-handed way for specifying, today, and field 324 supports a short-handed way for specifying now, thereby providing a quick way to schedule a multi-point electronic conference on-demand. In one embodiment, schedule pane 304 further includes a scrollable calendar for facilitating selection of the conference date for the conference to be scheduled.

As shown in FIG. 5, participant pane 306 includes fixed or expandable display areas 340–344, control buttons 346–352 and input areas 354–355. Display areas 340–344 display scheduled participants, address books/independent directory services, members of a selected addressed book/independent directory service respectively. Add button 346 adds a selected member of an address book/independent directory service to the list of scheduled participants, whereas delete button 348 performs the opposite, removing a scheduled participant. Address book and directory service buttons 350–352 controls whether address books or independent directory services are displayed in expandable display area 344. Input field 354 facilitates characters to be entered by the user, and used as search criteria for retrieving members of the selected address book/independent directory service for display in display area 342. Input field 355 facilitates the entering of remarks such as audio/video requirements, conference chairmanship, needed applications, etc. for the conference being scheduled. In one embodiment, input field 354 also allows special names, e.g. %Doe1, be entered as a scheduled participant to hold a place for a conference participant who's identity has not been identified yet.

As shown in FIG. 6, participant pane 306 further includes pop-up dialog 358 for showing the connection status, when connecting the user to an independent directory service 108, in response to the user's selection of the independent directory service 108. In one embodiment, pop-up dialog 358 includes cancel button 360 for canceling the connection being attempted.

Figure 7:
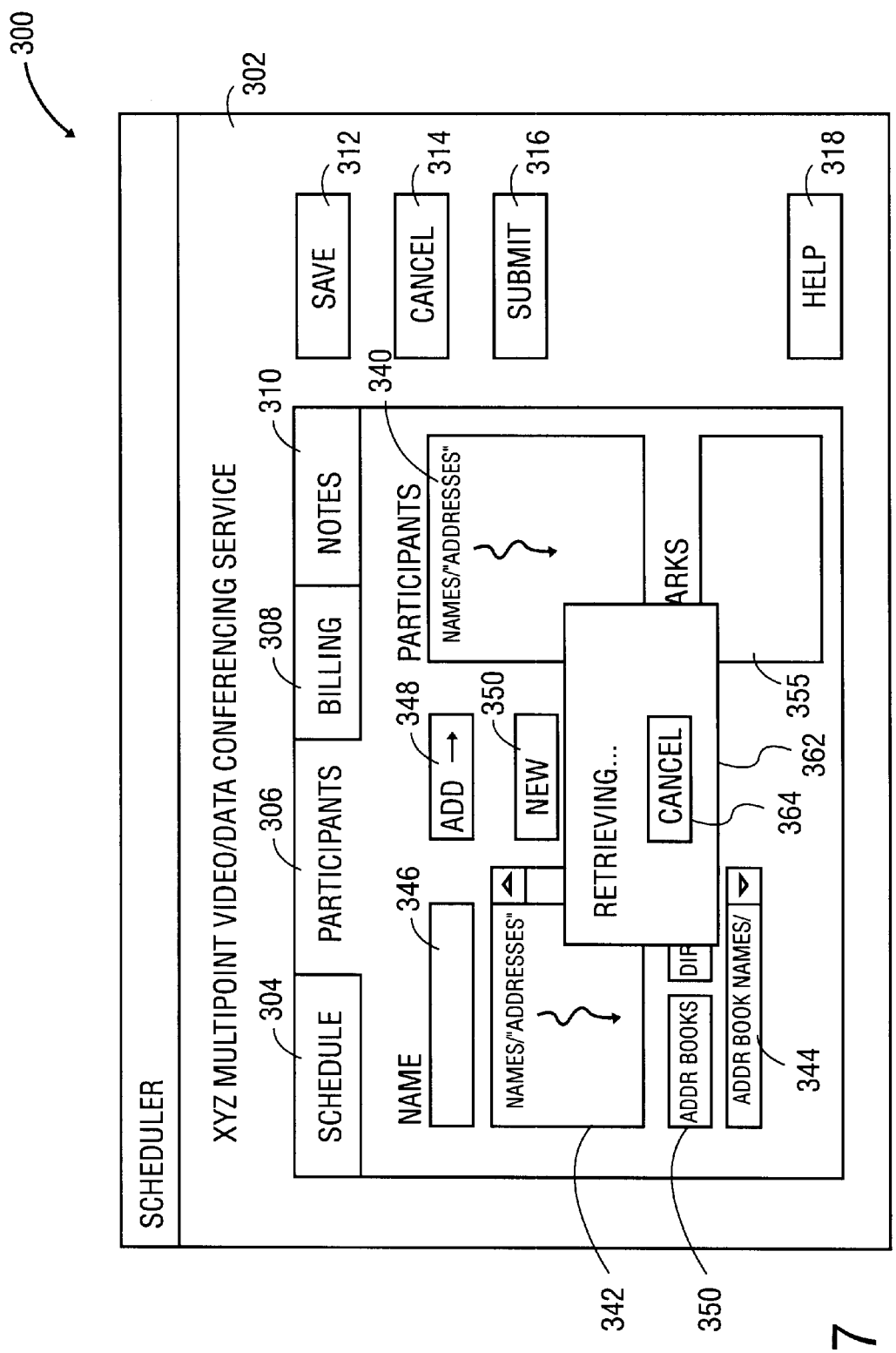

As shown in FIG. 7, participant pane 306 further includes pop-up dialog 360 for showing the retrieval status when retrieving additional members from the connected independent directory service 108, in response to the user scrolling beyond the previously retrieved members of the connected independent directory service 108. In one embodiment, pop-up dialog 362 also includes cancel button 364 for canceling the retrieval in progress.

Figure 8:
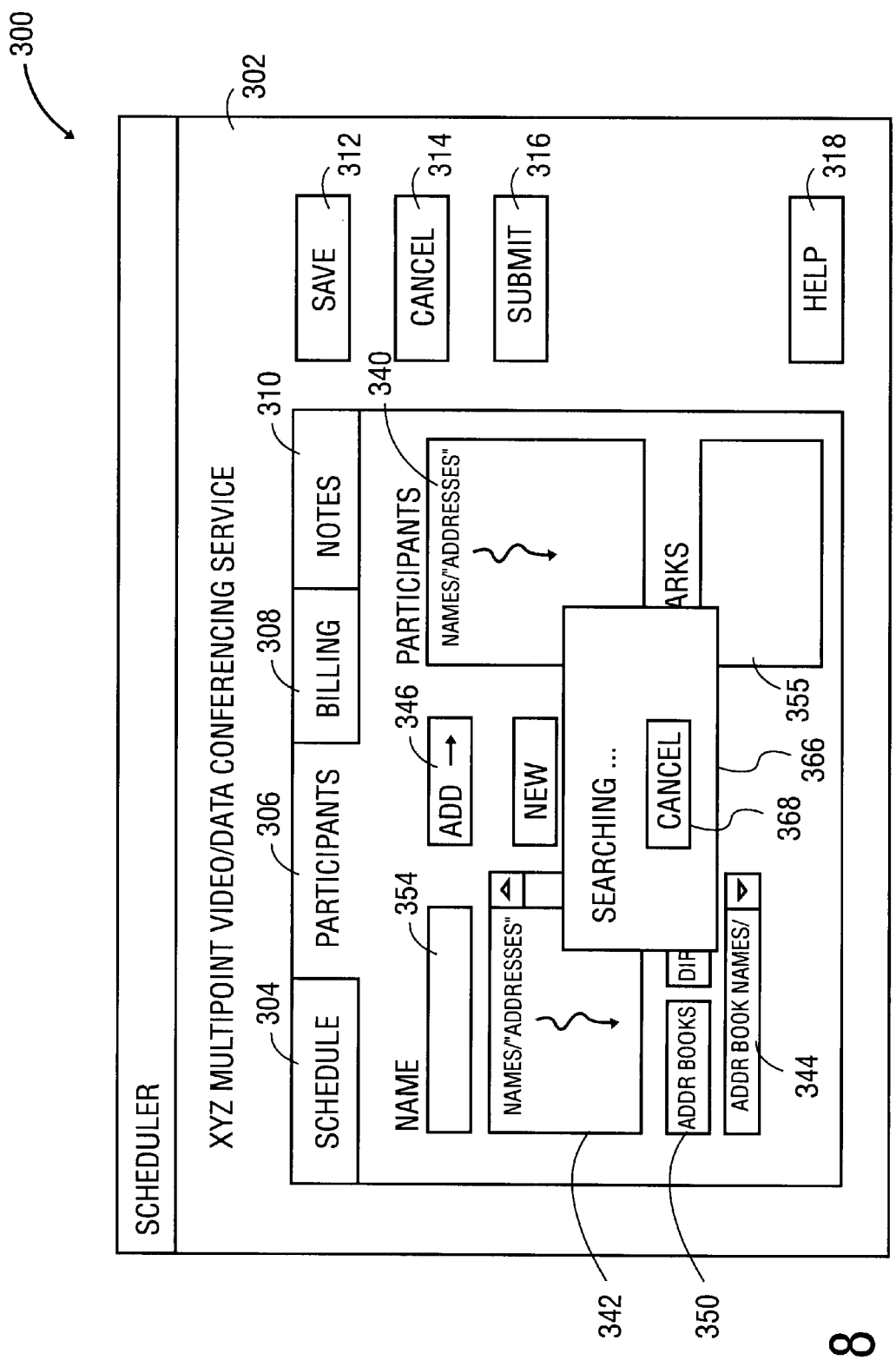

As shown in FIG. 8, participant pane 306 further includes pop-up dialog 366 for showing the searching (retrieval) status when searching (retrieving) additional members from the connected independent directory service 108, in response to the user entering characters into input field 354. Preferably, pop-up dialog 366 also includes cancel button 368 for canceling the search (retrieval) in progress.

Figure 9:
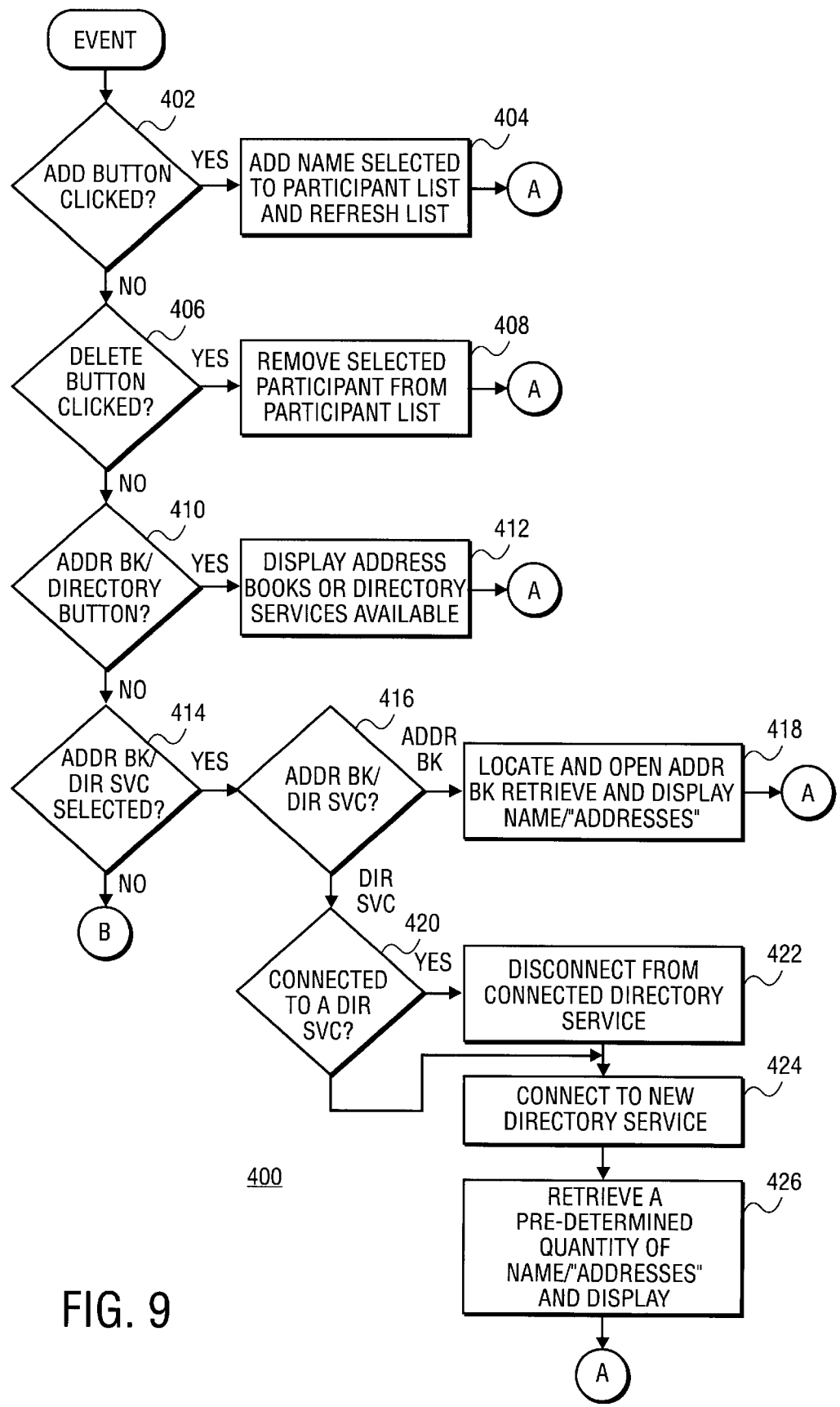
FIGS. 9–10 are block diagrams illustrating one embodiment of the operational flow of the scheduler illustrated by FIGS. 4–8.
Figure 10:
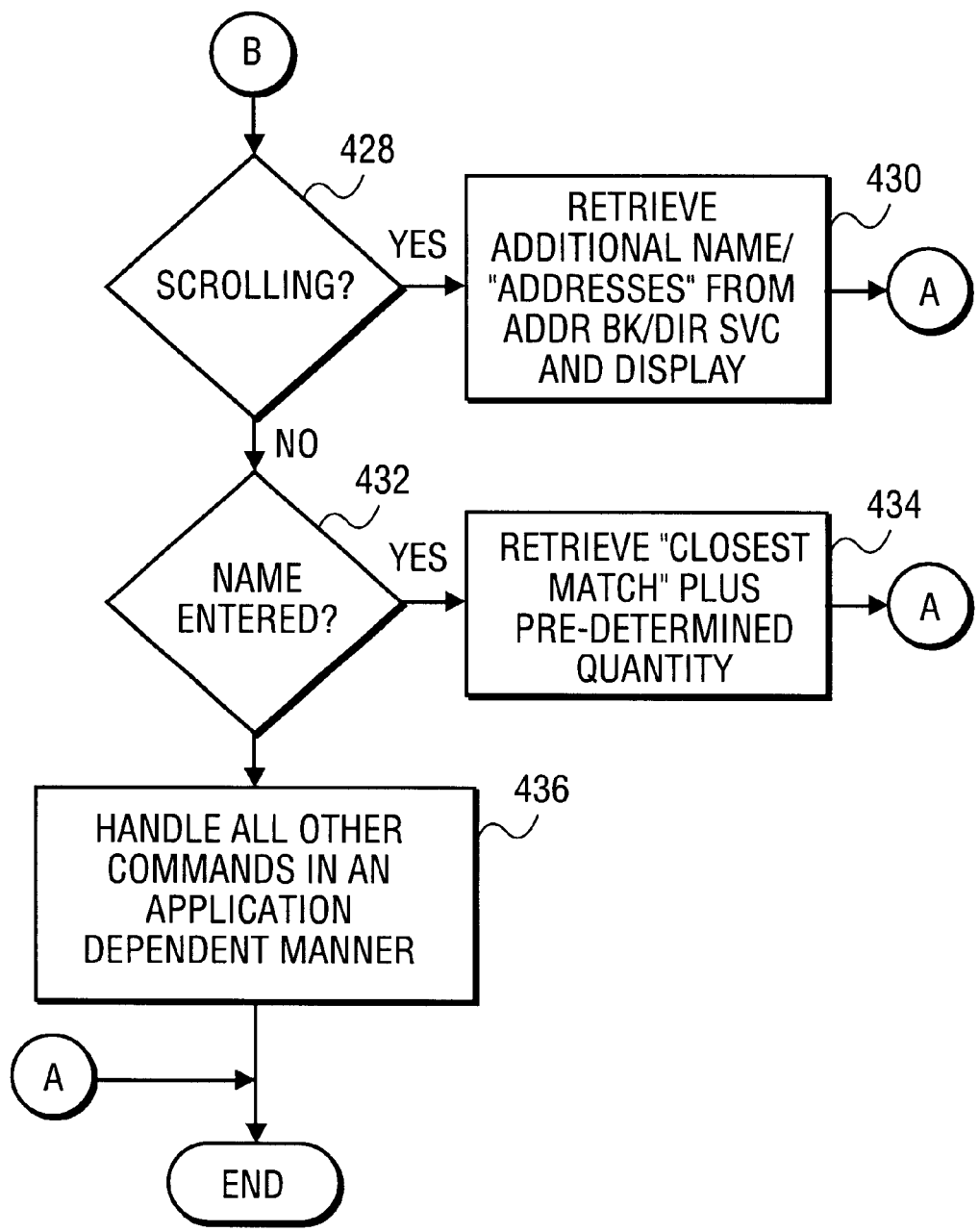

FIGS. 9–10 illustrate one embodiment of the scheduler's operational flow in support of participants pane 306. As shown, in response to a user interaction event, the scheduler determines whether add button 346 was clicked, step 402. If add button 346 was clicked, the scheduler adds the selected member of the address book/independent directory service to the scheduled participant list, and refreshes the scheduled participant list display, step 404. If add button 346 was not clicked, the scheduler determines whether delete button 348 was clicked, step 406. If delete button 348 was clicked, the scheduler deletes the selected scheduled participant from the scheduled participant list, and refreshes the scheduled participant list display, step 408.

If delete button 348 was not clicked either, the scheduler determines whether address book button 350 or independent directory service button 352 was clicked, step 410. If one of the buttons 350–352 was clicked, the scheduler ascertains and displays either address books or independent directory services available, depending on which button was clicked, step 412. If neither address book nor directory service buttons 350–352 were clicked, the scheduler determines whether an address book or an independent directory service was selected, step 414. If an address book/independent directory service was selected, the scheduler further determines whether the user has previously selected to work with address books or directory services, step 416. If the user has previously selected to work with address books, the scheduler locates and opens the address books, step 418. Additionally, the scheduler retrieves and displays a number of members of the selected addressed book. On the other hand, if the user has previously selected to work with an independent directory service, the scheduler further determines if it is concurrently connected to another independent directory service, step 420. If the scheduler is currently connected to another independent directory service, the scheduler disconnects from the current independent directory service, step 422. Either case, the scheduler then connects to the newly selected independent directory service, step 424. Additionally, the scheduler retrieves and displays a number of the members of the connected independent directory service, step 426.

On the other hand, if it was determined back at step 414 that the user interaction event was not the selection of an address book/directory service member, the scheduler determines if the user was scrolling the displayed members and have scrolled to the end of the previously retrieved members, step 428. If the user has done so, the scheduler retrieves additional members from the current address book/independent directory service, step 430. If the user interaction was not scrolling either, the scheduler determines if the user has entered characters into the name field, step 432. If the determination is affirmative, the scheduler retrieves members from the current address book/independent directory service with names that most closely match the characters entered by the user, step 434.

Finally, for all user interactions other than those enumerated above, the scheduler handles the user interaction in an application dependent manner, step 436. As will be appreciated by those skilled in the art, the above described order of processing is merely illustrative in purpose, user interactions with the participants pane 306 may be processed and handled by the scheduler in numerous other ways.

Thus, a method and apparatus for scheduling multi-point electronic conference has been described. As will be appreciated by those skilled in the art, given the typical size of membership of public directory services (in the order of millions ), the present invention provides a significantly larger domain than the prior art, from which a user may select conference participants, thereby substantially improving the effectiveness of automated or computer assisted multi-point electronic conference scheduling.

While the method and apparatus of the present invention has been described in terms of the above illustrated embodiments, those skilled in the art will recognize that the invention is not limited to the embodiments described. The present invention may be practiced with modification and alteration within the spirit and scope of the appended claims. The description is thus to be regarded as illustrative instead of restrictive on the present invention.

What is claimed is:

1. An apparatus comprising:
   an execution unit for executing programming instructions;
   a storage medium coupled to the execution unit having stored therein a plurality of programming instructions to be executed by the execution unit, wherein while being executed, the programming instructions facilitates scheduling of a multi-point electronic conference with a multi-point electronic conferencing control service for a user, including facilitating selective access by the user to one or more private address books and one or more remote independent public directory services having names and electronic conferencing connection addresses of a plurality of persons for selection by the user of one or more of said persons to be scheduled participants of the multi-point electronic conference being scheduled.

2. The apparatus as set forth in claim 1, wherein while being executed, the programming instructions allow the user to select a remote independent public directory service from a list of available remote independent public directory services, and in response, the programming instructions automatically connect the user to the selected remote independent public directory service, retrieve and display a first subset of said persons for the user to select.

3. The apparatus as set forth in claim 2, wherein while being executed, the programming instructions also provide an end user interface element for the user to request connection to a remote independent public directory service, and in response, provide said list of available remote independent public directory services for the user to select.

4. The apparatus as set forth in claim 2, wherein while being executed, the programming instructions also retrieve and display a second subset of said persons from the connected remote independent public directory service for the user to select, in response to the user scrolling to the end of said first subset.

5. The apparatus as set forth in claim 2, wherein while being executed, the programming instructions also retrieve and display a second subset of said persons from the connected remote independent public directory service for the user to select, in response to search criteria input by the user.

6. The apparatus as set forth in claim 5, wherein the search criteria include a plurality of characters input by the user in a name field, and the second subset retrieved are persons with names that at least partially match the characters input into the name field by the user.

7. The apparatus as set forth in claim 1, wherein
   the apparatus is a computer based conferencing system; and
   while being executed, the programming instructions further facilitate participation in a multi-point electronic conference by the user.

8. The apparatus as set forth in claim 1, wherein
   the apparatus is a computer based multi-point conferencing control unit;
   while being executed, the programming instructions further provide the multi-point electronic conferencing control service; and
   the user is a user of an electronic conferencing system connected to the multi-point electronic conferencing control service provided.

9. The apparatus as set forth in claim 8, wherein
   the programming instructions further provide application sharing services for remote sharing functions provided by the programming instructions with complementarily equipped electronic conferencing systems connected to the multi-point electronic conferencing control service provided, without requiring replication and execution of the programming instructions on the connected electronic conferencing systems; and
   said multi-point conference scheduling is facilitated through the application sharing services.

10. The apparatus as set forth in claim 1, wherein while being executed, the programming instructions also allow the user to resubmit a previously submitted conference schedule.

11. The apparatus as set forth in claim 1, wherein while being executed, the programming instructions also allow the user to include a pseudo-person as a scheduled conference participant.

12. The apparatus as set forth in claim 1, wherein while being executed, the programming instructions also allow the user to input remarks associated with an electronic conference being scheduled.

13. A machine implemented method for facilitating multi-point electronic conference scheduling by a user, the method comprising the steps of:
   a) selectively requesting access to one of a plurality of private address books or one of a plurality of remote independent public directory service having names and electronic conferencing connection addresses for a plurality of persons by a user;
   b) automatically connecting to a requested one of the remote independent public directory services if the remote independent public directory service was selectively requested in (a); and
   c) facilitating selection of one or more of said persons as conference participants of a multi-point electronic participants by the user.

14. The method as set forth in claim 13, wherein step (a) includes providing a plurality of remote independent public directory services for the user to select.

15. The method as set forth in claim 14, wherein step (a) further includes providing an end user interface element for the user to make said selective request, and in response to a selection for remote independent public directory service, providing said plurality of remote independent public directory services for the user to select a remote independent public directory service.

16. The method as set forth in claim 13, wherein step (c) further includes retrieving a first subset of said persons from the connected remote independent public directory service, and displaying said retrieved first subset as potential conference participants for the user to select.

17. The method as set forth in claim 16, wherein step (c) further includes retrieving a second subset of said persons from the connected remote independent public directory service, and displaying said retrieved second subset as additional potential conference participants for the user to select, in response to the user scrolling to the end of said first subset.

18. The method as set forth in claim 16, wherein step (c) further includes inputting of search criteria by the user, and in response, retrieving a second subset of said persons from the connected directory service, and displaying said retrieved second subset as additional potential conference participants for the user to select.

19. The method as set forth in claim 18, wherein the search criteria include a plurality of characters of a name, and the second subset includes person with names that at least partially match the characters input by the user.

20. The method as set forth in claim 13, wherein the method further includes step (d) facilitating participation in a multi-point electronic conference by the user.

21. The method as set forth in claim 13, wherein the method further includes step (d) providing multi-point electronic conferencing control services, said user being a user of an electronic conferencing system connected to the multi-point electronic conferencing control service provided.

22. The method as set forth in claim 21, wherein step (d) includes providing application sharing services for remote sharing functions provided by the multi-point electronic conferencing control service with complementarily equipped electronic conferencing systems connected to the multi-point electronic conferencing control service provided, without requiring replication and execution of the functions on the connected electronic conferencing systems; and step (c) includes facilitating said multi-point conference scheduling through said application sharing service.

23. The method as set forth in claim 13, wherein the method further includes step (d) resubmitting a previously submitted conference schedule by the user.

24. The method as set forth in claim 13, wherein the method further includes step (d) inputting a pseudo-person as a scheduled conference participant by the user.

25. The method as set forth in claim 13, wherein the method further includes step (d) inputting remarks associated with an electronic conference being scheduled by the user.

26. A machine implemented method for facilitating multi-point conference scheduling by a user, the method comprising the steps of:

(a) selectively requesting access to one of a plurality of private address books, or one of a plurality of remote independent public directory services having names and electronic conferencing connection addresses for a plurality of persons by a user; and (b) automatically connecting to a requested one of the remote independent public directory services if the remote independent public directory service was selectively requested.

* * * * *

UNITED STATES PATENT AND TRADEMARK OFFICE
CERTIFICATE OF CORRECTION

PATENT NO.    : 6,396,510 B1                                                Page 1 of 1
DATED         : May 28, 2002
INVENTOR(S)   : Pendse et al.

It is certified that error appears in the above-identified patent and that said Letters Patent is hereby corrected as shown below:

Column 1,
Lines 60-61, delete "In the presently one embodiments," and insert -- In one embodiment, --.

Column 3,
Lines 35 and 40, delete "MCU 106" and insert -- MCU 104 --.

Column 5,
Line 25, delete "specifying, today" and insert -- specifying today --.

Signed and Sealed this

Seventeenth Day of September, 2002

Attest:

JAMES E. ROGAN
Attesting Officer                    Director of the United States Patent and Trademark Office